United States Patent

[11] 3,619,748

| [72] | Inventor | John F. Eastham |
| | | Long Ditton, England |
| [21] | Appl. No. | 860,744 |
| [22] | Filed | Sept. 24, 1969 |
| [45] | Patented | Nov. 9, 1971 |
| [73] | Assignee | National Research Development Corporation |
| | | London, England |
| [32] | Priority | Oct. 2, 1968 |
| [33] | | Great Britain |
| [31] | | 46,789/68 |

[54] TWO-SPEED, SINGLE-PHASE ELECTRIC MOTORS
9 Claims, 12 Drawing Figs.

[52] U.S. Cl. ...................................................... 318/224 R
[51] Int. Cl. .................................................. H02k 17/14, H02k 17/16
[50] Field of Search .......................................... 318/224, 224.1, 225

[56] References Cited
UNITED STATES PATENTS
3,233,160  2/1966  Rawcliffe ..................... 318/224

*Primary Examiner*—Gene Z. Rubinson
*Attorney*—Larson and Taylor

ABSTRACT: A close ratio, two-speed, pole-changing single-phase electric motor having a stator winding tapped and connected for pole-changing by the so-called phase-mixing or step-phase modulation technique and including means for providing starting torque comprising, preferably, shading rings or gap variation at every pole.

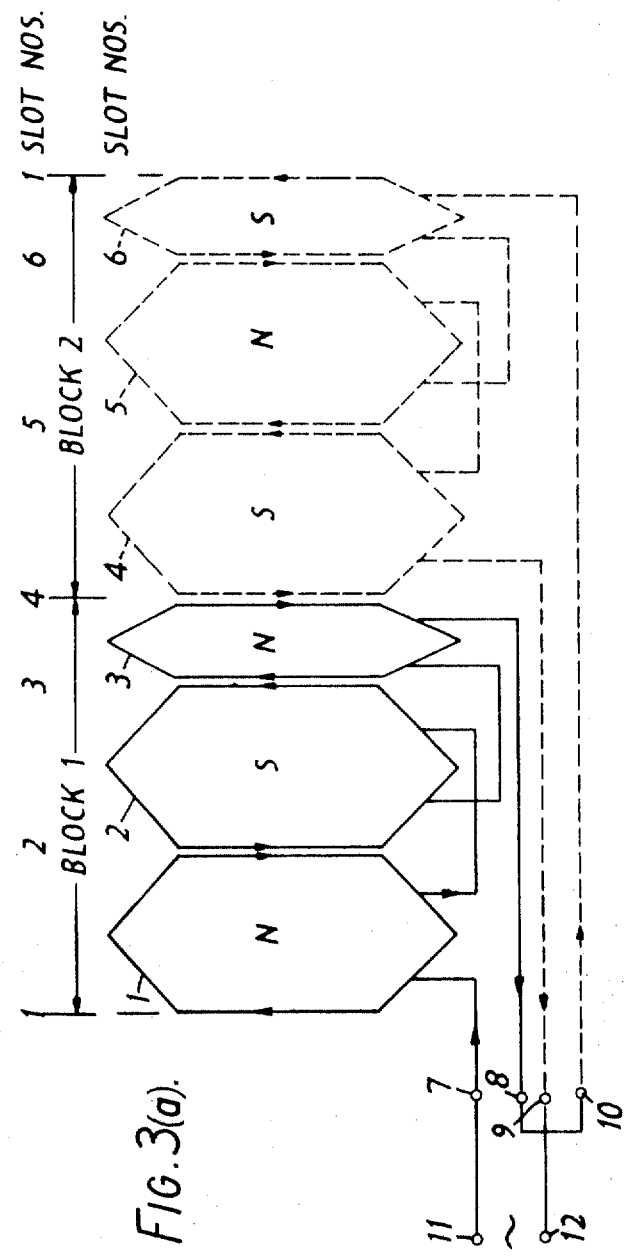

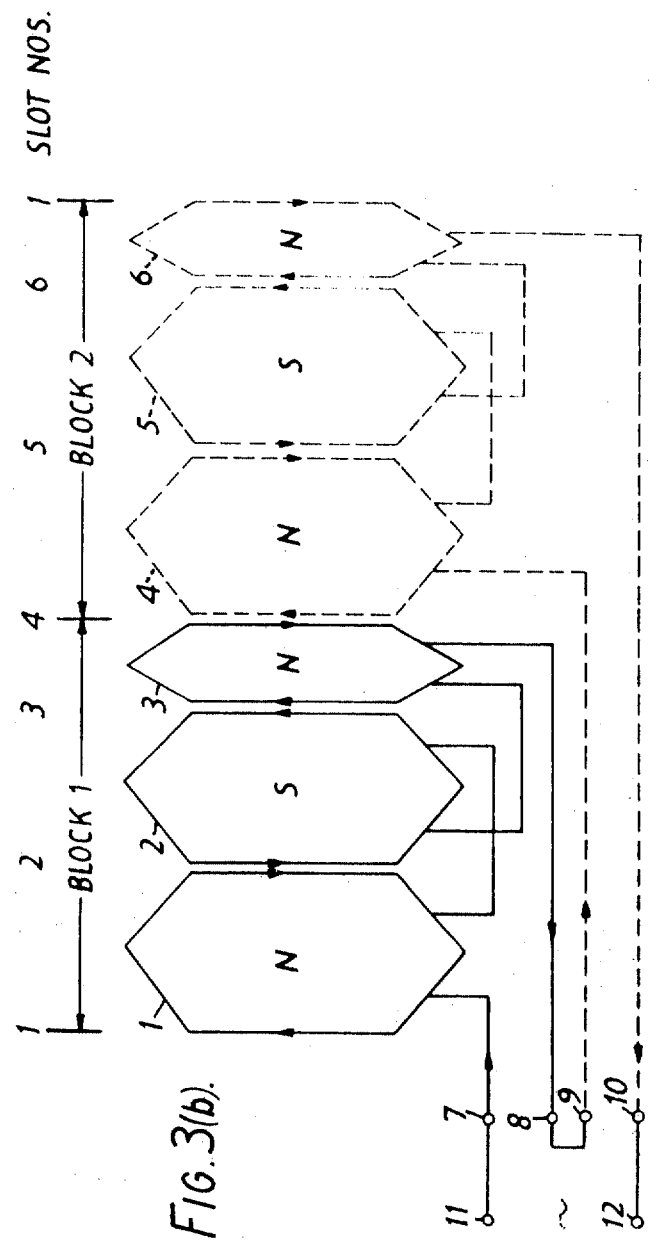

TWO-SPEED, SINGLE-PHASE ELECTRIC MOTORS

This invention relates to rotary electric machines, particularly to close-ratio, two-speed, pole-changing, motors using either shaded pole or variable airgap starting arrangements.

There have already been described pole-changing windings which are based on phase-mixing of step-phase modulation techniques. It is the object of the present invention to apply the same principles to single-phase machines, in which the starting action is provided either by shading parts of the poles with conducting loops, or by providing a variable airgap, or by a combination of both techniques. The invention more particularly provides close-ratio motors in which the alternative pole numbers differ by two poles.

Accordingly, the invention provides a single-phase, alternating current, pole-changing electric motor having alternative pole numbers in close ratio and differing by two poles, comprising a stator winding adapted to provide said alternative pole numbers by producing the effect of step-phase modulation in opposite senses at two diametrically located points on a wave having a pole number between said alternative pole numbers and having means for providing starting torque.

Preferably, the starting torque is provided by the use of shading rings or gap variation or both at every pole. Alternatively the starting means may be provided only at selected positions.

In order that the invention may be further understood and readily carried into practice, the known step-phase modulation technique and embodiments of the present invention will now be described in detail, the embodiments being by way of example, with reference to the accompanying drawings, in which:

FIGS. 1a, b and c are diagrams showing the development of a single-phase four pole/six pole machine;

Figure 2A:
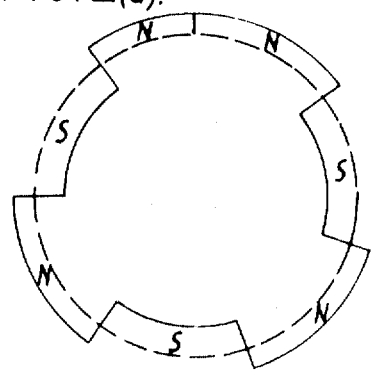
Figure 2B:
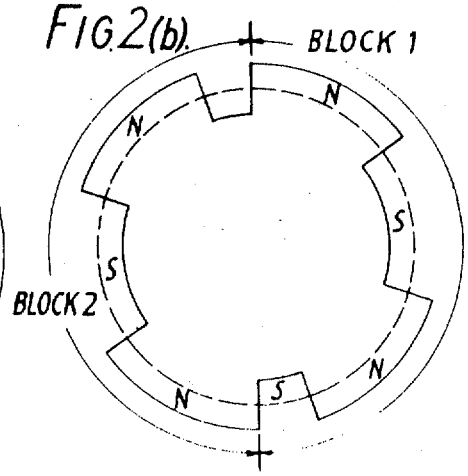

FIGS. 2(a), (b) and (c) are diagrams showing the development of a single-phase six pole/eight pole machine;

FIG. 2(a) represents the original wave having a pole number of $6\frac{2}{3}$;

FIG. 2(b) represents the application of 120° step-phase modulation; and

Figure 1A:
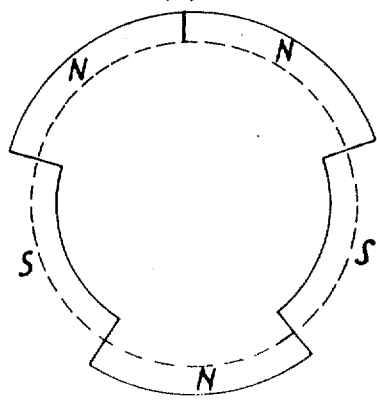
FIG. 1(a) represents the original wave having a pole number of 5.
Figure 1B:
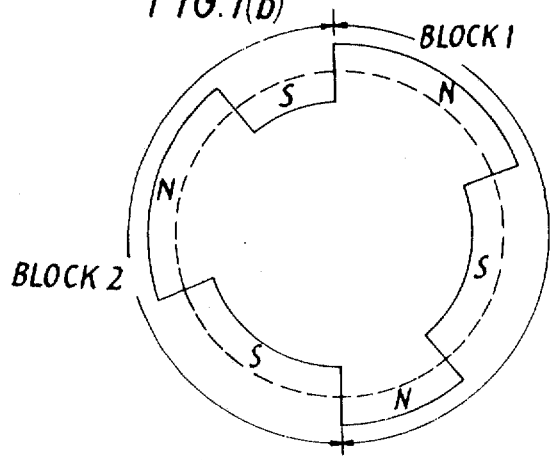
FIG. 1(b) represents the application of 90° step-phase modulation to the wave of FIG. 1(a)
Figure 1C:
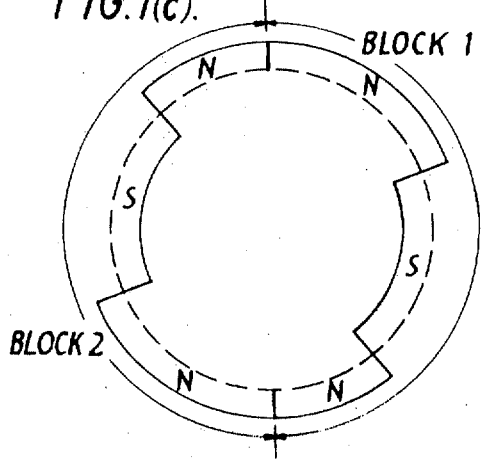
FIG. 1(c) represents the application of −90° step-phase modulation.
Figure 2C:
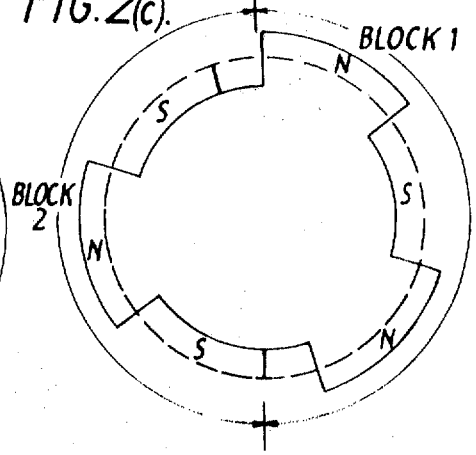

FIG. 2(c) represents the application of −60° step-phase modulation;

FIGS. 3(a) and 3(b) are diagrams of a winding of six coils in six nonuniformly spaced slots, corresponding to the waves of FIGS. 1(b) and 1(c);

FIG. 3(a) shows the six pole connection; and

Figure 4:
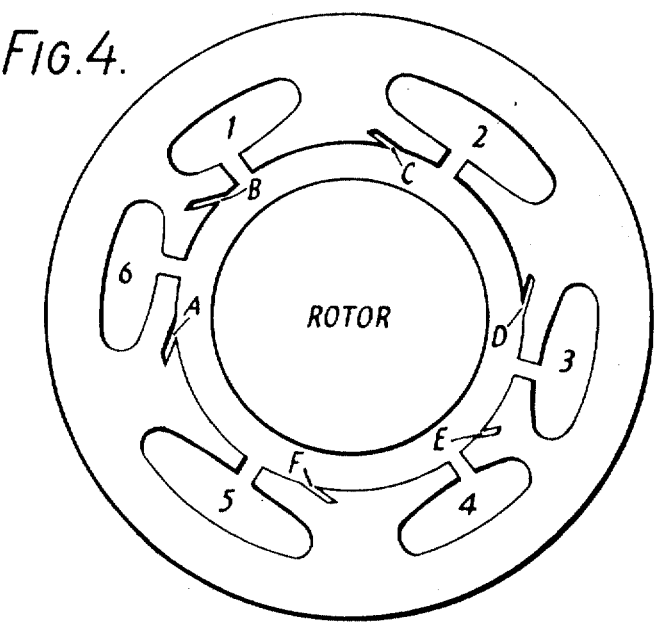
Figure 5:
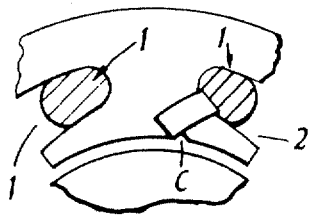
Figure 6:
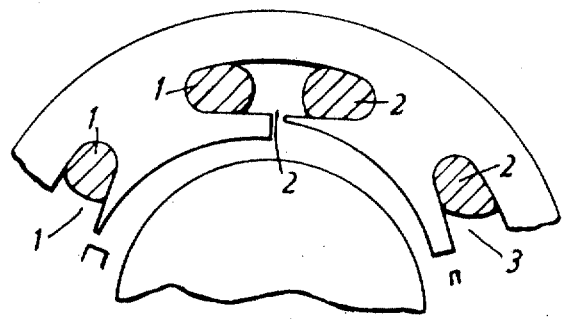

FIG. 3(d) shows the four pole connection; 3(a), 3(b);

FIG. 4 is a diagram of a stator punching for a stator for the winding of FIGS. 3a, 3b;

FIG. 5 is a detail diagram showing a shading ring for a wound stator;

FIG. 6 is a detail diagram showing a variable airgap configuration; and

Figure 7:
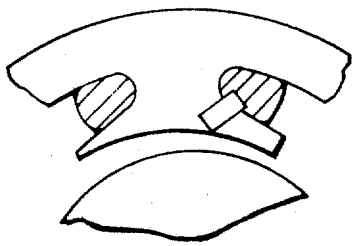

FIG. 7 is a detail diagram showing a combination of shading ring and variable airgap.

According to the known step-phase modulation method, an original wave of pole number which lies between the two wanted pole numbers is step-phase modulated in a first direction at two diametrically opposed positions to produce a first working pole number. The second pole number is provided by step-phase modulations in the opposite direction at the same points.

An example is illustrated in FIG. 1 for the case of a four pole/six pole machine with an original pole number of 5. FIG. 1(a) shows the original five pole wave and FIG. 1(b) shows that the effect of 90° step-phase modulations is to provide a wave with a dominant six pole pattern. Similarly, if the step-phase modulations are −90°, then the configuration of FIG. 1(c) is produced, which has a dominant four pole pattern.

It will be observed that whilst the waves are phase-modulated in each condition, the pattern of FIG. 1(c) may be obtained from that of FIG. 1(b) by reversing block 2 of the excitation with respect to block 1.

The system is not restricted to either four pole/six pole machines nor to ±90° step-phase modulations. For the general case of $p_1/p_2$ pole machine, where $p_2 - p_1 = 2$, if the original pole number is $p_0$, where $p_2 > p_0 > p_1$, then step-phase modulations of $90(p_2-p_0)°$ and $90(p_1-p_0)°$ are required. For example, if $p_2 = 8$, $p_1 = 6$ and $p_0 = 6\frac{2}{3}$ then the configurations of FIG. 2 are produced. FIG. 2(a) shows the original $6\frac{2}{3}$ pole wave and FIG. 2(b) illustrates the effect of $90(8-6\frac{2}{3})=120°$ step-phase modulations. Similarly, FIG. 2(c) shows the effect of $90(6-6\frac{2}{3})=−60°$ step-phase modulations.

It will be observed from the patterns of FIG. 2 that the pole pattern in the six pole case is superior to that in the eight pole case. Thus, if it is desired to enhance the performance at one speed of the machine, then the original pole number should be chosen to be closer to the pole number at this speed than to the alternative pole number.

Considering, now, the requirements of practical machines, the simplest form of AC winding which can provide the excitation required consists of one coil per pole suitably connected so that the current flows in, say, the clockwise direction in the coils producing one polarity of flux and in the anticlockwise direction in those producing the other. Thus, for example, the winding required for the configurations of FIG. 1(b) and FIG. 1(c) consists of six suitably connected coils arranged in six nonuniformly spaced slots. A developed plan view of such an arrangement is illustrated in FIG. 3(a) and FIG. 3(b) wherein the coils are consecutively numbered 1 to 6 and have go and return conductors in consecutive slots. Coils 1, 2 and 3 are serially connected together between terminals 7 and 8. Coils 4, 5 and 6 are serially connected together between terminals 9 and 10.

In the six pole connection of FIG. 3(a), terminals 8 and 10 are joined together and the single phase supply from a source at terminals 11 and 12 is connected to terminals 7 and 9.

In the four pole connection of FIG. 3(b), terminals 8 and 9 are joined together and the supply from terminals 11 and 12 is connected to terminals 7 and 10, so that the second block of coils, numbered 4 to 6, are reversed in current carrying sense relatively to the connection of FIG. 3(a).

The stators of small induction machines are commonly constructed by stacking suitably punched sheet steel laminations. FIG. 4 shows a form of stator punching which is able to accept the winding of FIG. 3. The large slots, referenced 1 to 6, correspond with the like-numbered slots of FIG. 3(a) and FIG. 3(b). Small slots, referenced A to F, are also provided in the punching. These slots are formed to contain the shading rings which are required to provide starting torque.

A part view of a stator made up from the stator punchings of FIG. 4, and showing two of the slots, referenced 1 and 2, is shown at FIG. 5. In this diagram the position of one coil, referenced 1, and one shading ring, in slot C, are shown.

Whilst the use of shading rings or gap variation or both on all of the pole faces of the stator is a preferred configuration in some cases it may be advantageous to provide starting means only at selected positions. For example shading rings could be provided only at the slots marked ACDF on FIG. 4.

FIG. 6 shows an example of the second starting method, using a nonuniform airgap. Slots 1, 2 and 3 are shown in the FIGURE and coils 1 and 2 are shown wound in these slots. The airgap across the pole face increases continuously from the higher numbered slot end to the lower numbered slot end around the inner circumference of the stator. It is to be understood that other forms of airgap variation are possible, including a simple step.

The variable gap configuration may again be applied between all of the slots or only between slots 1 and 2, 2 and 3, 4 and 5, 5 and 6 of FIG. 4.

Both the variable gap and the shading ring techniques can be applied simultaneously as shown in FIG. 7.

I claim:

1. A single phase, alternating current, pole-changing electric motor having alternative pole numbers in close ratio comprising a stator including a diametrically symmetrical slot arrangement providing a plurality of pole faces of unequal length for each half circumference, a stator winding comprising a plurality of coils arranged as two groups each group extending around a half circumference of the stator, said plurality of coils being equal to said plurality of pole faces, means for connecting said coil groups together, means for reversing the current-carrying sense of one of said coil groups so as to provide said alternative pole numbers, and means for providing a starting torque.

2. An electric motor as claimed in claim 1 wherein said starting torque providing means comprises shading ring means.

3. An electric motor as claimed in claim 1 wherein said starting torque providing means comprises variable air gap means.

4. An electric motor as claimed in claim 1 wherein said starting torque providing means comprises both shading ring means and variable air gap means.

5. An electric motor as claimed in claim 1 wherein said stator provides alternative pole numbers differing by two poles.

6. An electric motor as claimed in claim 2 wherein said shading ring means comprises shading rings arranged on every pole of said stator.

7. An electric motor as claimed in claim 3 wherein said variable airgap means comprises a variable gap on every pole of said stator.

8. An electric motor as claimed in claim 1 wherein said means for providing a starting torque comprises a gap varying progressively in width from one end of each pole face to the other.

9. An electric motor as claimed in claim 1 wherein said means for providing a starting torque comprises a gap varying stepwise progressively in width from one end of each pole face to the other.

* * * * *